US012577822B2

(12) United States Patent
Mottier et al.

(10) Patent No.: US 12,577,822 B2
(45) Date of Patent: Mar. 17, 2026

(54) MOTORISED SEALED CELL DOOR FOR DOUBLE DOOR CONNECTION SYSTEM

(71) Applicant: GETINGE LIFE SCIENCE FRANCE, Vendôme (FR)

(72) Inventors: Emmanuel Mottier, Aze (FR); Florentin Cordier, Saint Firmin des Pres (FR)

(73) Assignee: GETINGE LIFE SCIENCE FRANCE, Vendôme (FR)

( * ) Notice: Subject to any disclaimer, the term of this patent is extended or adjusted under 35 U.S.C. 154(b) by 0 days.

(21) Appl. No.: 18/715,289

(22) PCT Filed: Dec. 1, 2022

(86) PCT No.: PCT/EP2022/084122
§ 371 (c)(1),
(2) Date: May 31, 2024

(87) PCT Pub. No.: WO2023/099690
PCT Pub. Date: Jun. 8, 2023

(65) Prior Publication Data

US 2025/0020016 A1 Jan. 16, 2025

(30) Foreign Application Priority Data

Dec. 3, 2021 (FR) ....................................... 2112940

(51) Int. Cl.
*E05F 15/614* (2015.01)
*E05B 81/06* (2014.01)
(Continued)

(52) U.S. Cl.
CPC ............ *E05F 15/614* (2015.01); *E05B 81/06* (2013.01); *E05B 81/18* (2013.01); *E05D 3/02* (2013.01);
(Continued)

(58) Field of Classification Search
CPC ..... E05F 15/614; B01L 1/02; B01L 2300/043
See application file for complete search history.

(56) References Cited

U.S. PATENT DOCUMENTS

| | | | | |
|---|---|---|---|---|
| 8,950,624 | B2 * | 2/2015 | Sacca | G21F 7/005 220/825 |
| 9,754,691 | B2 * | 9/2017 | Dufour | B01L 1/02 |

(Continued)

FOREIGN PATENT DOCUMENTS

| | | | | |
|---|---|---|---|---|
| CN | 1509047 A | 6/2004 | | |
| EP | 1500851 A2 * | 1/2005 | | F16J 13/18 |
| FR | 2695343 A1 | 3/1994 | | |

OTHER PUBLICATIONS

International Search Report for PCT/EP2022/084122 dated Feb. 23, 2023.
Written Opinion for PCT/EP2022/084122 dated Feb. 23, 2023.

*Primary Examiner* — Muhammad Ijaz
*Assistant Examiner* — Susan M. Heschel
(74) *Attorney, Agent, or Firm* — McDonald Hopkins LLC

(57) ABSTRACT

A connection assembly for a sealed transfer cell, including a flange, a hinge, and a door connected to the flange by the hinge which can be moved between an open state and a closed state, the flange including central opening sealed by the door when this door is closed. The hinge includes a cylindrical rotary element securely connected to the door and two fixed bearings securely connected to the flange, the rotary element extending between the two bearings having two ends each engaged in a bearing, and this hinge contains an electric motor for opening and closing the door in a controlled manner.

6 Claims, 3 Drawing Sheets

(51) Int. Cl.

| | |
|---|---|
| ***E05B 81/18*** | (2014.01) |
| ***E05D 3/02*** | (2006.01) |
| ***E06B 7/16*** | (2006.01) |

(52) U.S. Cl.

CPC ........... *E06B 7/16* (2013.01); *E05Y 2201/442* (2013.01); *E05Y 2201/628* (2013.01); *E05Y 2201/71* (2013.01)

(56) References Cited

U.S. PATENT DOCUMENTS

2010/0187929 A1* 7/2010 Hishida .................. H02K 16/00 310/112
2016/0201382 A1 7/2016 Dufour
2021/0140516 A1* 5/2021 Gong ........................ F16H 1/46

* cited by examiner

MOTORISED SEALED CELL DOOR FOR DOUBLE DOOR CONNECTION SYSTEM

CROSS-REFERENCE TO RELATED APPLICATIONS

This is the National Stage application of PCT international application PCT/EP2022/084122, filed on Dec. 1, 2022, which claims the priority of French Patent Application No. 2112940, filed Dec. 3, 2021, both of which are incorporated herein by reference in their entireties.

TECHNICAL FIELD

The invention relates to the field of transferring components from a sealed container to a sealed cell in a sealed manner, with a double door connection system.

PRIOR ART

In various different industrial sectors, it is necessary to carry out tasks in a confined atmosphere, for example to protect the environment from radioactivity or toxicity, or to carry out these tasks in an aseptic atmosphere, or both simultaneously.

It is possible to ensure the transfer of equipment or products from a container to a cell without breaking the seal by using a double door connection device, such a device is known for example from document FR2695343.

In such a device, the cell is closed by a door fitted to a flange of the cell and is attached to the latter by a hinge. The container is closed by a door mounted in a flange of this container to which it is attached by a bayonet connection. The two flanges can be connected to one another by another bayonet connection.

It is common to refer to the flange and the door of the cell as an alpha flange and alpha door, and to refer to the flange and door of the container as a beta flange and beta door.

The connection of the container to the cell is made by pressing the flange of the container against the flange of the cell, and making it rotate it on itself, which has the effect of:

- securing the two flanges to one another by their bayonet connection;
- securing the two doors to one another by means of another bayonet connection;
- releasing the bayonet connection joining the container door to its flange.

Once this connection has been made, the cell door can be pivoted inwards about its hinge so as to open the communication: the container door then being securely attached to the cell door by the corresponding bayonet connection, it opens together with the cell door.

Once a product or a component has been transferred from the container to the cell, the cell door with the container door attached to it are turned by pivoting about the hinge. The container is then pivoted back on itself in opposite direction, which has the effect of:

- securing the door of the container to the flange of the container;
- releasing the container door from the cell door;
- releasing the container flange from the cell flange.

In general terms, a glove ring is provided in the cell wall in the proximity of the cell flange, which allows an operator to pass their hand into the cell through a glove, to open the cell door after the connection is complete and to close this cell door at the start of disconnection.

The addition of this glove ring is a constraint which affects the dimensions of the cell, since it involves, inter alia, piercing the cell wall and can thus mean an increase of its dimensions. Systems also exist which have motorised doors but these have a large footprint which is a disadvantage.

The aim of the invention is to provide a solution for motorising such a door so as to open and close it in a controlled manner with a reduced space requirement.

DISCLOSURE OF THE INVENTION

For this purpose the subject-matter of the invention is a connection assembly for a sealed transfer cell, including a flange, a hinge, and a door connected to the flange by the hinge which can be moved between an open state and a closed state, the flange including a central opening sealed by the door when this door is closed, the hinge including a cylindrical rotary element securely connected to the door and two fixed bearings securely connected to the flange, the rotary element extending between the two bearings having two ends each engaged in a bearing, characterised in that the hinge contains an electric motor for opening and closing the door in a controlled manner.

By means of the invention, it is not necessary to provide additional means at the cell so that an operator can access the door to manoeuvre it, and there is no need to increase the size of the cell to accommodate a bulky motorised system.

The invention also relates to an assembly as defined, wherein the hinge contains a gearbox coupled to the motor for driving the rotary element.

The invention also relates to an assembly as defined, wherein the motor includes a stator securely connected to one of the bearings and an output shaft coupled to the rotary element.

The invention also relates to an assembly as defined, wherein the gearbox extends into the rotary element and is interposed between the output shaft and the rotary element.

The invention also relates to an assembly as defined, wherein the gearbox is coupled to the end of the rotary element extending into the bearing opposite the bearing to which the stator of the motor is securely connected.

The invention also relates to an assembly as defined, wherein the gearbox comprises a drive shaft coupled to a plate fixed to the end of the rotary element by screws.

The invention also relates to an assembly as defined, wherein the motor and direct current motor.

The invention also relates to an assembly as defined, wherein the flange is fitted with a rotary lock which can take up a position of locking the door in a closed position and a position of releasing the door.

The invention also relates to an assembly as defined, wherein the rotary lock is motorised so as to be operated in a controlled manner.

DETAILED DESCRIPTION OF PARTICULAR EMBODIMENTS

Figure 1:
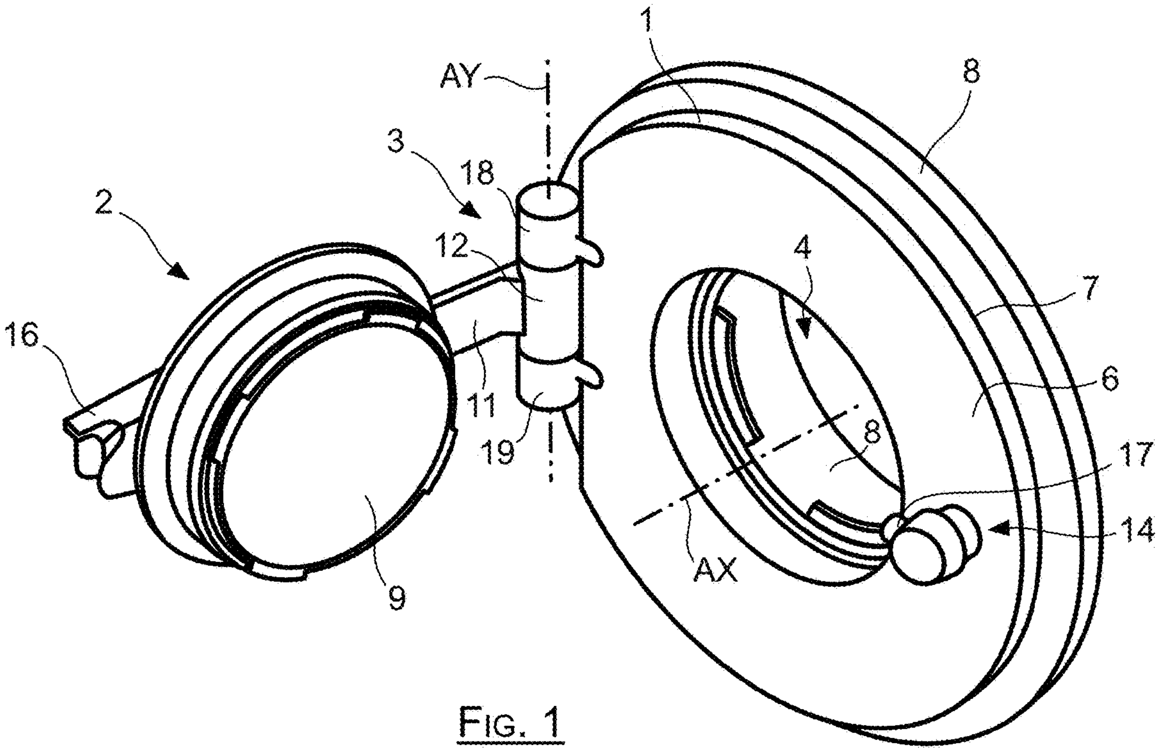
FIG. 1 is a perspective overview of a flange fitted with a door in an open position according to the invention.
Figure 2:
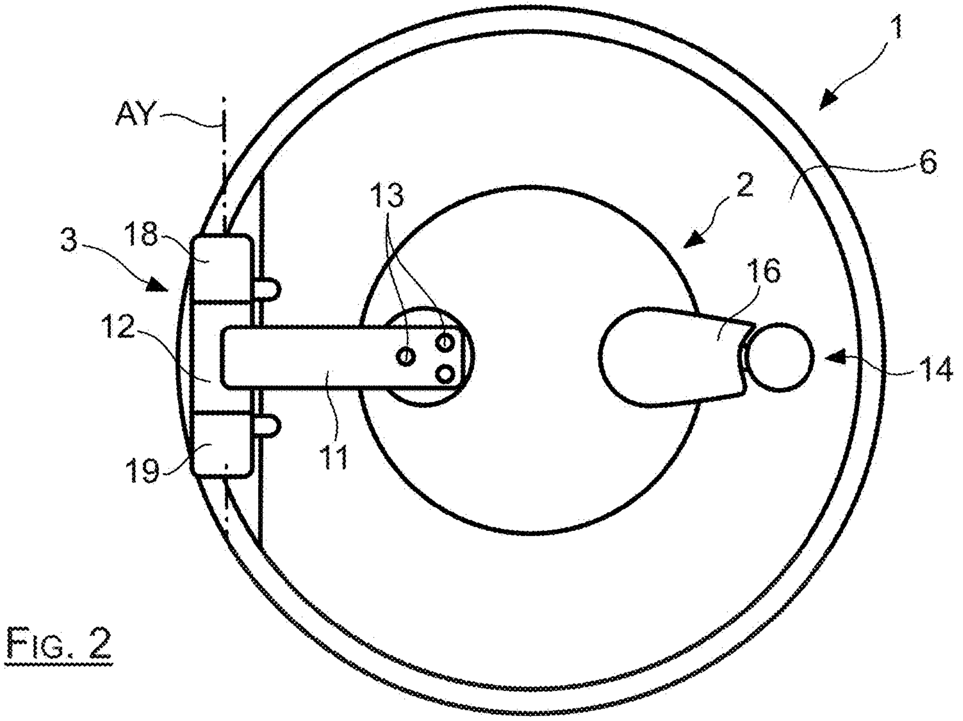
FIG. 2 is front view of a flange fitted with a door shown in a closed position according to the invention.
Figure 3:
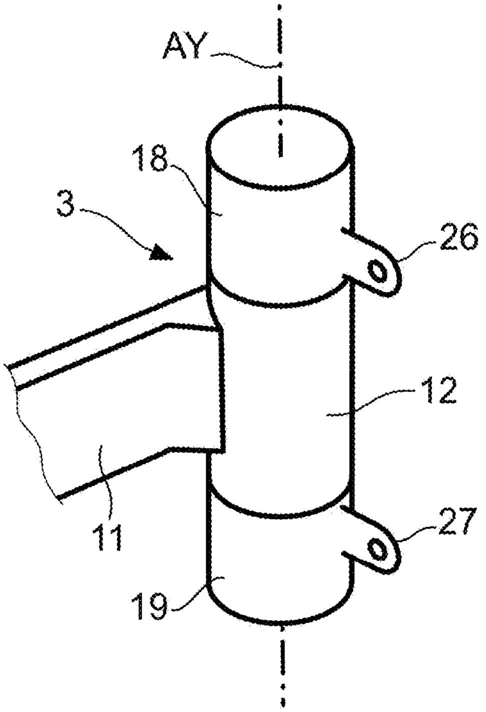
FIG. 3 is a perspective view of the hinge interposed between the flange and the door according to the invention.

In FIG. 1, a flange 1 of a cell supports a door 2 which is secured to this flange 1 by a hinge 3. This flange 1 which is fixed into a not shown opening of a cell wall, has a general circular shape about an axis AX, approximating that of a crown for defining a circular central opening 4.

It includes an inner face 6 facing the interior of the cell it is fitted onto and an outer face 7 facing the exterior of the cell it is fitted onto and to which a flange 8 of the container is coupled from which a transfer is to be made to the cell (or vice versa).

This opening 4 which is free in the position of FIG. 1, can be closed by closing the door 2 against the flange 1 by pivoting this door 2 about the hinge 3, this hinge 3 extending in an axis AY which is normal to the axis AX while being spaced apart therefrom by a distance greater than the radius of the central opening 4.

In FIG. 1, a door 9 of the container is attached to the inner face of the cell door 2 by a bayonet connection which is not shown. The door 2 as such is connected to the hinge 3 by means of an arm 11 which has a first end securely connected to a cylindrical rotary element 12 of the hinge 3, and a second end securely connected to the door 2, by fastening elements 13 such as screws or the like.

The flange 1 is fitted with a locking device comprising a rotary lock 14 and the door 2 is equipped with a cam 16, or block, connected securely to the door 2 and from which it projects.

The rotary lock 14 is located opposite the hinge 3, and projects from the inner face 6 and is pivotable about an axis parallel to the axis AX, this lock 14 including a roller 17 extending parallel to the face 6.

When the door 2 is closed, the cam 16 is located opposite the lock 14, such that pivoting the lock 14 about its axis allows its roller 17 to engage in the cam 16, so as to lock the door. Rotating the lock 14 in opposite direction disengages its roller 17 so as to release the cam 16 and allow the door 2 to be opened.

This rotary lock 14 is advantageously extended by a manoeuvring pin passing through the outer face 7 of the flange and allowing an operator to actuate it from outside the cell by manoeuvring this pin, so as to lock or unlock the door. This lock 14 can also be motorised so as to be operated in a controlled manner in order to lock or unlock the door, the motor can then be advantageously integral with this lock 14.

As indicated above, the hinge 3 includes a rotary element 12, pivoting about the axis AY. This rotary element 12 is supported by an upper fixed bearing and a lower fixed bearing marked 18 and 19 which are securely attached to the inner face 6.

According to the invention, the hinge 3 incorporates an electric motor for pivoting the rotary element 12 relative to the bearings 18 and 19, which are fixed to the flange 1 in order to open and close the door 2 in a controlled manner.

As indicated above, this hinge 3 includes an upper bearing 18 and a lower bearing 19 between which the rotary element 12 pivots.

The bearing 18 includes a tubular portion 21 closed by a bottom 22, and similarly the bearing 19 includes a tubular portion 23 closed by a bottom 24. These bearings 18 and 19 also each include a radial tab 26, 27 with a hole which is traversed by a screw screwed into the flange 1 in order to securely connect each of these bearings to the flange 1.

Figure 4:
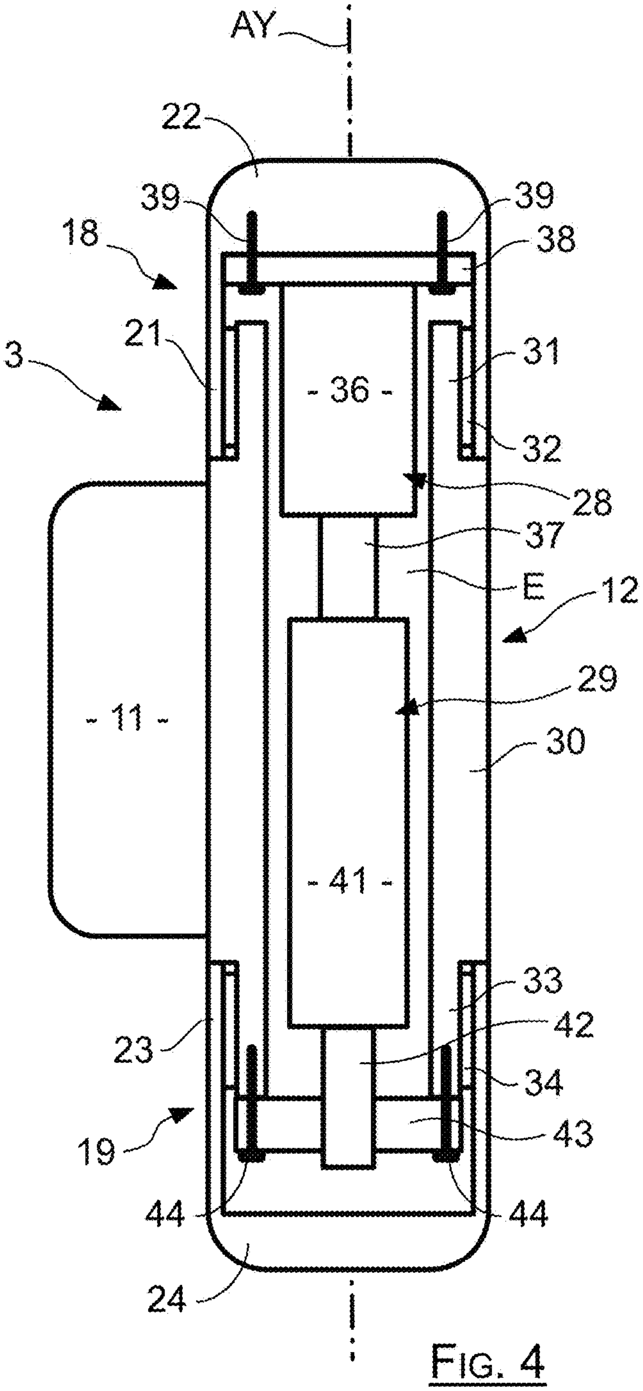
FIG. 4 is a cross-sectional view of the hinge incorporating a motor according to the invention.

The rotary element 12, which is generally tubular extends between these two bearings 18 and 19, along the axis AY which corresponds to the axis of this hinge 3. As shown in FIG. 4, the bearings 18 and 19 and the rotary element 12, which are generally tubular, jointly delimit an internal space E accommodating a motor 28 and a gearbox 29 with their coupling means for electrically actuating said hinge.

More particularly, the rotary element 12 includes a body 30 having an outer diameter corresponding to the outer diameter of the bearings, extended by an upper end 31 with a smaller diameter which is engaged in the tubular portion 21 of the bearing 18. A ring 32 is interposed between the upper end 31 and the tubular portion 21 to allow a rotation of the element 12 relative to the upper bearing 18 with low friction.

In a similar manner, the element 12 includes a lower end 33 of smaller diameter than its body 30 and which is engaged in the tubular portion 23 of the lower bearing 19 with the interposition of a ring 34 allowing a rotation of the element 12 relative to the bearing 19 with low friction.

As shown in FIG. 4, the motor 28 includes a cylindrical stator 36 with a diameter significantly smaller than that of the tubular portion 21 and the upper end 31 of the element 12, and an output shaft 37.

This stator 36 has its base securely connected to a disc-shaped base 38 with an outer diameter coinciding with the inner diameter of the tubular portion 21, for example by screws that are not shown. In addition, this base 38 includes holes along its outer periphery traversed by screws 39 which extend parallel to the axis AY ensuring its attachment to the base 22, i.e. the secure connection of the stator 36 to the upper bearing 18.

As shown in FIG. 4, the stator 36 extends substantially into the tubular portion 21 of the bearing 18, and its output shaft 37 is coupled to the gearbox 29 which includes a cylindrical body 41 extending into the element 12 substantially along its length, this body 41 supporting a drive shaft 42 which is coupled to the element 12 by means of a plate 43.

More particularly, and as shown in FIG. 4, the drive shaft 42 passes at least partially through the plate 43 to be rotatably connected to it, this shaft being for example splined or keyed. The plate 43 has a disc shape with a diameter corresponding to the outer diameter of the end 33 and it is applied against this tubular end 33.

In addition, this plate 43 includes holes along its external periphery through which screws 44 parallel to the axis AY are screwed into the thickness of the tubular end 33. This plate 43 is thus securely connected to the element 12, the lower end of which it closes, and it is connected in rotation to the drive shaft 42.

In practice, the motorised hinge can be mounted by following the following steps:

- fixing the base 38 to the stator 36 of the motor 28 for example by means of screws, not shown;
- fixing the base 38 to the bottom 22 of the upper bearing 18 by means of screws 39;
- engaging the body 41 of the gearbox 29 on the output shaft 37 of the motor to couple them to one another;
- engaging the ring 32 about the upper end 31 of the rotary element 12;
- engaging the rotary element 12 about the gearbox 29 and engaging its upper end 31 fitted with the ring 32 in the tubular portion 21 of the bearing 18;
- engaging the plate 43 about the drive shaft 42 and fixing this plate to the lower end 33 by means of screws 44;

fitting the lower end 33 of the rotary element 12 with the ring 34 and engaging the assembly in the tubular portion 23 of the lower bearing 19;

fixing the bearings 18 and 19 to the flange 1 by screwing their tabs 26 and 27.

The disassembly of the hinge can be performed by executing these steps in reverse order.

In the example of the figures, the coupling of the shaft 42 to the body 41 is ensured by means of the plate 43, the shaft 42 being splined or keyed for example. This coupling can also be formed by means of an expandable connector such as those sold commercially under the trade name Ringspann.

The motor 28 is advantageously a DC motor, with a diameter of in the order of 20 mm, the length of the motor gearbox assembly consisting of the motor 28 coupled to the gearbox 29 being in the order of 120 mm.

Figure 5:
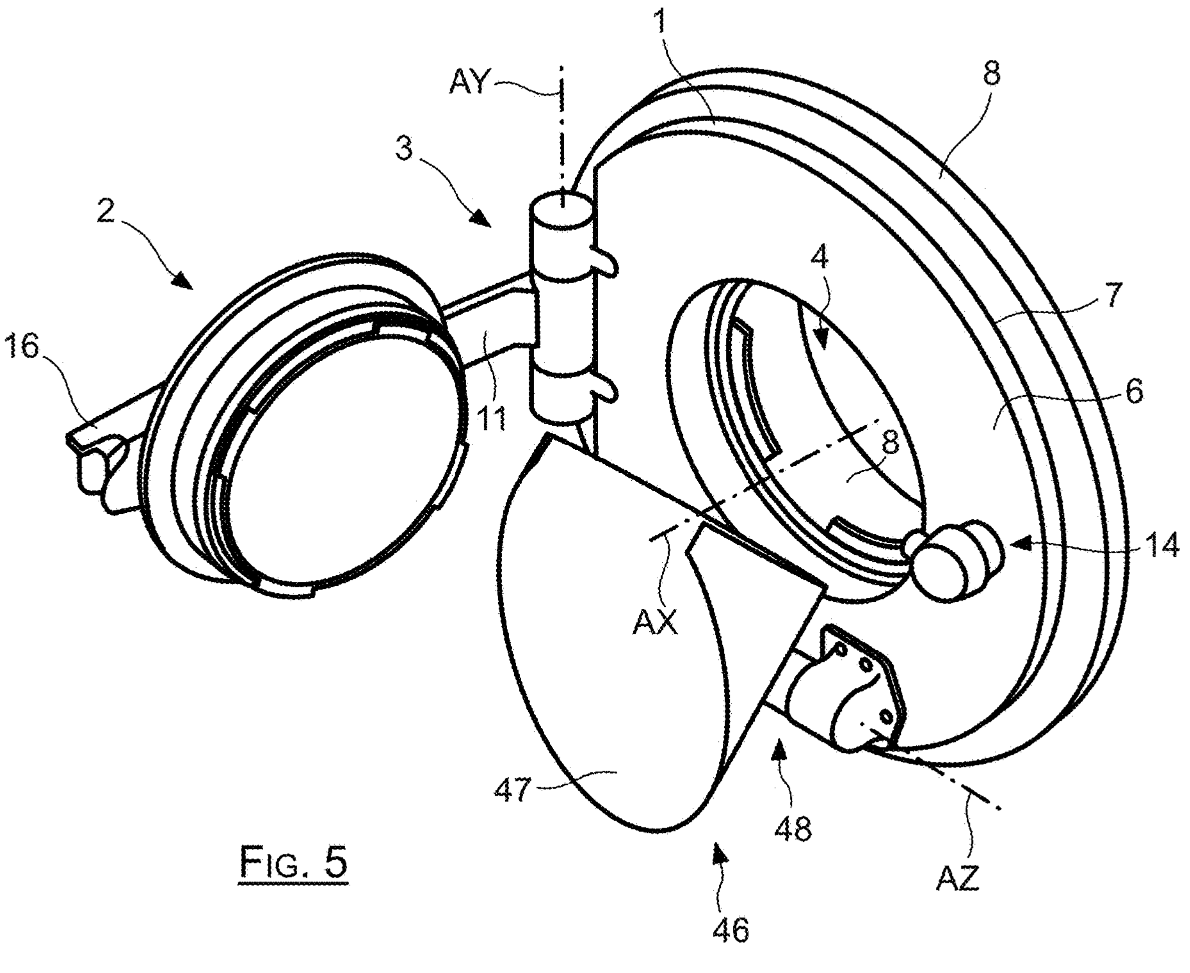
FIG. 5 is a perspective overview of a flange equipped with a door and also with a chute, both of which can be operated in a controlled manner.

As shown in FIG. 5, the flange 1 can advantageously be fitted with a chute 46 comprising a tubular element 47 with a diameter corresponding to that of the opening 4, which is connected to the flange 1 by another motorised hinge 48.

This tubular element 47 can thus be moved between a position of use in which it extends the opening 4 to the interior of the cell and a disengaged position in which it is removed from this opening 4 to allow it to be closed by the door 2, whereas in FIG. 5, the tubular element is represented in an intermediate position.

The motorised hinge 48 is of the same type as the motorised hinge 3, and as shown in FIG. 5, it is also fixed to the inner face 6 by its bearings, and it is connected to the tubular element 47 by its rotary element which extends between its bearings.

This hinge 48 runs along the edge of the opening 4 extending along an axis of rotation AZ normal to the axes AX and AY which are perpendicular to one another. In practice, when the door 2 is closed, the element 47 is in a disengaged position and extends along an axis parallel to the axis AY, so as not to interfere with the door 2. Once the door 2 is fully opened, it can be controlled to return to its operating position by rotating it through 90° about the axis AZ so as to extend along axis AX in extension of the opening 4.

Once the transfer to the cell is complete, the hinge 48 is controlled to place the tubular element 47 in disengaged position before operating the hinge 3 to close the door 2 on the opening 4 in order to close it.

In general, the invention allows the axis of the motor and the axis of rotation of the door to be merged, which allows a "pure torque" operation without generating lateral forces on the bearings when the door is operated, and allowing the door to rotate at a continuous and constant speed when operated.

The motor integrated into the hinge itself makes the assembly compact and avoids having a protruding remote or attached motor unit, so that cleaning the device is made significantly easier.

What is claimed is:

1. A connection assembly for a sealed transfer cell, the connection assembly including:

a flange adapted to be fixed to an opening of a wall of the sealed transfer cell, and adapted to be coupled to a container flange, a hinge, and a door connected to the flange by the hinge, wherein the door is configured to be moved between an open state and a closed state, wherein the flange is configured to be fitted with a rotary lock located opposite the hinge, wherein the rotary lock is configured to lock the door in the closed state and to release the door into the open state, wherein the flange includes a central opening configured to be sealed by the door when the door is in the closed state, wherein the hinge includes a cylindrical rotary element securely attached to the door and two fixed bearings securely connected to the flange, the cylindrical rotary element extending between the two fixed bearings and having two ends each engaged in one bearing of the two fixed bearings, wherein the hinge comprises an electric motor having an output shaft and a gearbox interposed between the output shaft and the cylindrical rotary element of the hinge, the gearbox extending in the rotary element and being coupled to the output shaft and to the rotary element to drive the rotary element, and wherein the electric motor is configured to open and close the door in a controlled manner.

2. The connection assembly according to claim 1, wherein the electric motor includes a stator securely connected to one bearing of the two fixed bearings and an output shaft coupled to the cylindrical rotary element.

3. The connection assembly according to claim 1, wherein the gearbox is coupled to an end of the two ends of the cylindrical rotary element extending into one bearing of the two bearings opposite another bearing of the two bearings to which the stator of the electric motor is securely connected.

4. The connection assembly according to claim 1, wherein the gearbox comprises a drive shaft coupled to a plate fixed to an end of the two ends of the cylindrical rotary element by screws.

5. The connection assembly according to claim 1, wherein the electric motor is a DC motor.

6. A method for mounting a connection assembly for a sealed transfer cell, the method including the steps of:

fixing a base to a stator of a motor;

fixing the base to a bottom of an upper bearing by screws;

engaging a body of a gearbox on an output shaft of the motor to couple the body and the output shaft to one another, engaging a first ring about an upper end of a rotary element, the gearbox extending into the rotary element by being interposed between the output shaft and the rotary element, and the gearbox being coupled to the output shaft and to the rotary element to drive the rotary element;

engaging the rotary element about the gearbox and engaging the upper end fitted with the ring in a tubular portion of the upper bearing;

engaging a plate about a drive shaft and fixing the plate to a lower end of the rotary element by screws;

fitting the lower end of the rotary element with a second ring and engaging the connection assembly in a tubular portion of a lower bearing; and fixing the bearings to a flange by screwing tabs.

* * * * *